JAMISON H. HARRISON, OF BOSTON, MASSACHUSETTS.

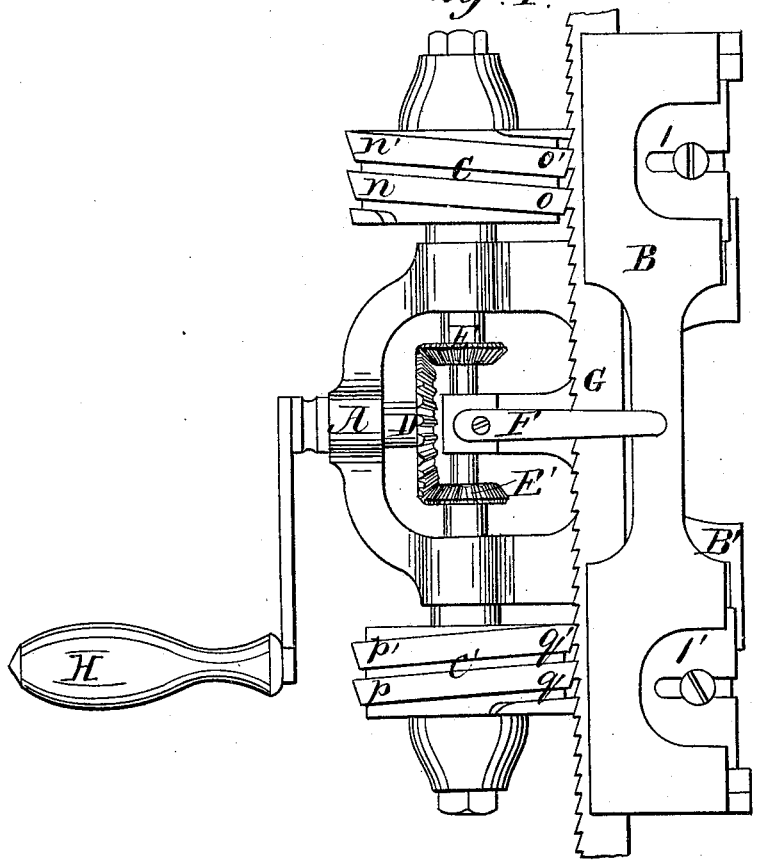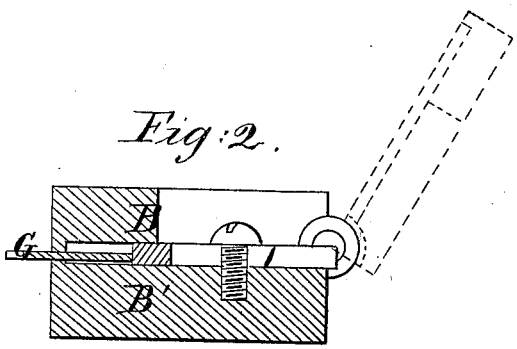

Letters Patent No. 89,042, dated April 20, 1869.

IMPROVEMENT IN SAW-SHARPENING DEVICE.

The Schedule referred to in these Letters Patent and making part of the same.

*To all whom it may concern:*

Be it known that I, JAMISON H. HARRISON, of Boston, in the county of Suffolk, and State of Massachusetts, have invented a certain new and useful Device for Sharpening Saws; and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists in forming spiral grinding-wheels, so that, when combined with a suitable guide, they shall grind the teeth of the saw, and at the same time shall move the saw, so that each tooth may come in contact with the wheels, and be properly sharpened.

Construction.

Figure 1, of the drawings, represents an elevation of my sharpener.

Figure 2 is a cross-section of the device for guiding the saw, and keeping it in position, so that the grinding-wheels C C, fig. 1, may act upon it.

A B B' is a frame, which serves as a guide for the saw, and as a hanging for the grinding-wheels, and the gear for driving the same.

C and C', fig. 1, are the grinding-wheels, and will be more fully described hereafter.

E and E' are two bevelled gears, one attached to the driving-shaft of the wheel C, and the other attached to the driving-shaft of the wheel C'.

D is a bevelled gear, which may be operated by the crank-handle H, and which actuates, through the gears E E', the grinding-wheels C C', causing them to revolve in opposite directions.

The plate B is hinged to B', as represented in fig. 2, and serves, together with B' and the adjustable plate I, as a guide to keep the saw in the proper position to be acted upon by the grinding-wheels C.

F, fig. 1, is a spring, which brings a sufficient pressure to bear upon B, and thus upon the saw G, to hold it in position, and yet allow the saw to pass freely through the guide.

The wheels C C', have screw-threads, $n$ $o$ $n'$ $o'$, and $p$ $q$ $p'$ $q'$, cut upon them, the pitch of the thread being equal to twice the pitch of the saw-teeth; or, in other words, equal to the length of two of the teeth, while the periphery of the threads is inclined, to correspond with the inclination of the teeth of the saw, as shown in fig. 1. These threads are either provided with emery, or have file-teeth cut upon them; or the wheels themselves may be made of stone, with threads cut upon them, so that when made to revolve, they will grind the teeth of the saw.

The grinding-threads and wheels are so arranged that the threads on C' take alternate teeth with the threads on C, and, since C' revolves in an opposite direction to C, each alternate tooth will have an opposite shear, to agree with the set of the tooth.

The drawings represent my invention when used with a hand-saw, but if I wish to apply my grinding-wheels to other kinds of saws, I have simply to provide suitable guides.

The grinding-wheels C C' serve a double purpose. They grind the tooth, and, as they revolve, cause the saw to slide along, in other words, to feed itself.

I do not claim the guides B B', nor the propelling-gear E E'; but

What I do claim as my invention, and desire to secure by Letters Patent of the United States, is—

The saw-sharpening wheels C and C', arranged to operate as described, and for the purpose set forth.

JAMISON H. HARRISON.

Witnesses:
WILLIAM EDSON,
A. HUN BERRY.